UNITED STATES PATENT OFFICE.

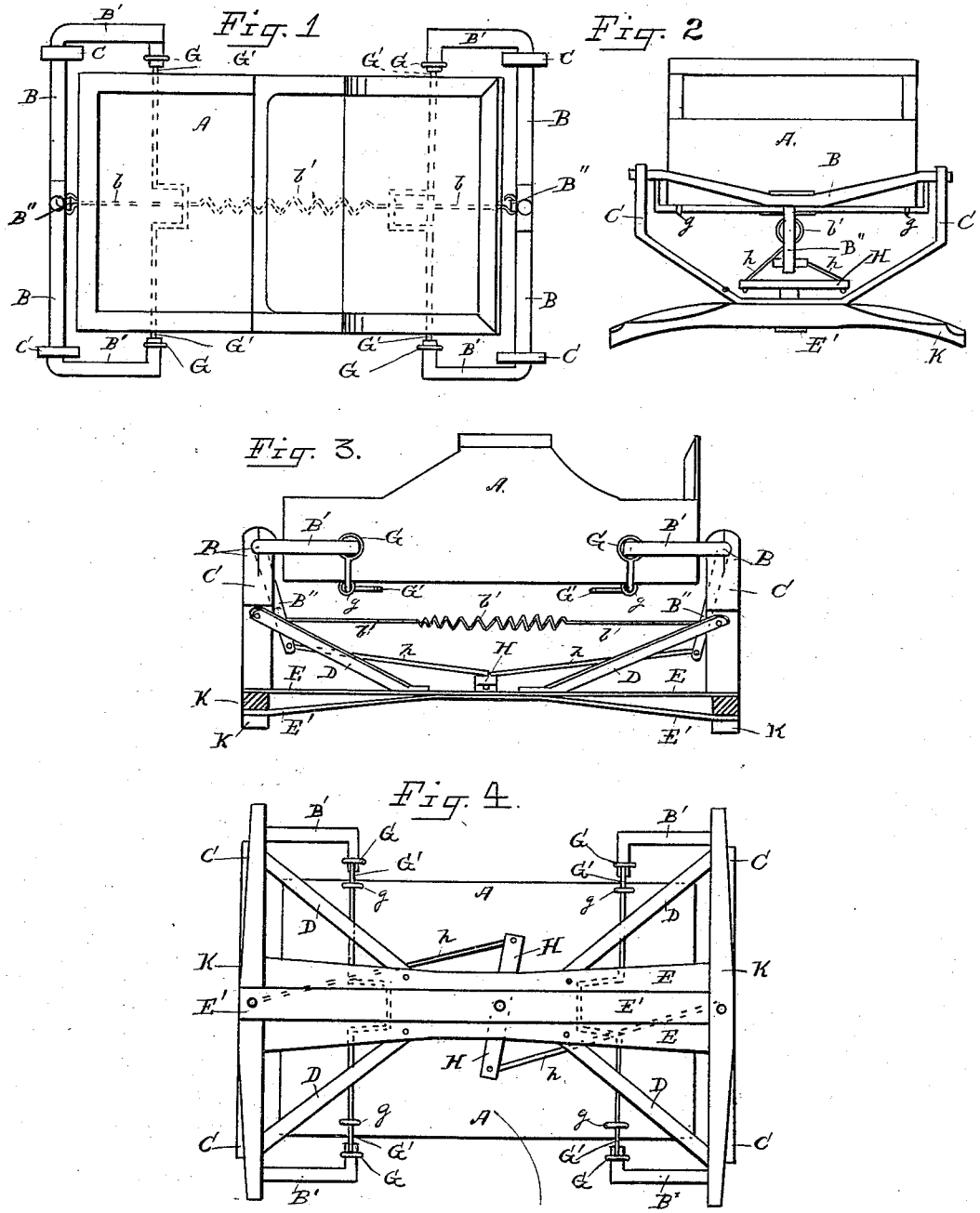

HENRY SPRINGER, OF MOUNT VERNON, INDIANA.

VEHICLE-SPRING.

SPECIFICATION forming part of Letters Patent No. 416,277, dated December 3, 1889.

Application filed April 6, 1889. Serial No. 306,194. (No model.)

*To all whom it may concern:*

Be it known that I, HENRY SPRINGER, a citizen of the United States, residing at Mount Vernon, in the county of Posey and State of Indiana, have invented certain new and useful Improvements in Springs for Vehicles; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in springs for vehicles, and has for its object to furnish a cheap and efficient spring.

The nature of the invention consists in providing the running-gear of a vehicle with strongly-braced supports at each end for two rock-shafts having dependent arms connected beneath the body of the vehicle to each other by means of two rods and a central spring, preferably a spiral spring; also, in providing the two rock-shafts at each of their outer extremities with short horizontal arms adapted to enter four loops at the ends of two rods secured in a transverse direction beneath the body of the vehicle, the said rods having a crank in the center and adapted to oscillate on their axes.

In the drawings accompanying this specification similar letters indicate similar parts.

Figure 1 is a plan view. Fig. 2 is an end elevation. Fig. 3 is a side elevation. Fig. 4 is a view taken from the under side of the vehicle.

The letter A indicates the body of the vehicle.

B are the rock-shafts.

C are the supports.

D are the braces.

E E' are the pieces which couple the front and rear axles.

G are the loops at the extremities of the transverse rods G'.

B' are the horizontal arms of the rock-shafts B.

B'' are the dependent (or vertical) arms.

b are the rods and b' the spring which connect the vertical arms with each other.

H is a cross-arm pivoted to the coupling E', and has rods h at each end connecting it with the vertical arms B'', the object of which is to limit the motion of the rock-shafts B.

g are fastenings to keep the transverse rods G' in their places, and at the same time permit them to oscillate on their axes.

K are the axles or axle-bed.

The body A is suspended by the transverse rods G' and the loops G, in combination with the other supporting devices and the spring b' and rods b.

Having described my invention, what I desire to secure by Letters Patent, and claim, is—

In combination with the body of a vehicle, the fastenings g, the transverse rods G', having loops G, the horizontal arms B', the rock-shafts B, the vertical arms B'', the rods b, the spring b', the pivoted cross-arm H, having rods h, and the supports C, substantially as herein shown and described, and for the purposes set forth.

In testimony whereof I affix my signature in presence of two witnesses.

HENRY SPRINGER.

Witnesses:
J. H. ROWE,
WILLIAM A. BROMMELBOUSE.